United States Patent
Lutz

(10) Patent No.: US 11,474,513 B2
(45) Date of Patent: Oct. 18, 2022

(54) COMMON VISUALIZATION OF PROCESS DATA AND PROCESS ALARMS

(71) Applicant: Benjamin Lutz, Pfinztal (DE)

(72) Inventor: Benjamin Lutz, Pfinztal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 326 days.

(21) Appl. No.: 16/775,944

(22) Filed: Jan. 29, 2020

(65) Prior Publication Data

US 2020/0241515 A1 Jul. 30, 2020

(30) Foreign Application Priority Data

Jan. 30, 2019 (EP) .................................... 19154574

(51) Int. Cl.
G05B 23/02 (2006.01)

(52) U.S. Cl.
CPC ................................ G05B 23/027 (2013.01)

(58) Field of Classification Search
None
See application file for complete search history.

(56) References Cited

U.S. PATENT DOCUMENTS

| | | |
|---|---|---|
| 2004/0148130 A1 | 7/2004 | Scott et al. |
| 2011/0213488 A1* | 9/2011 | Suzuki ............... G05B 23/0272 700/109 |
| 2016/0321906 A1* | 11/2016 | Whitney ............... G06F 40/186 |
| 2016/0328954 A1 | 11/2016 | Ramadoss et al. |
| 2017/0243466 A1* | 8/2017 | Krishnaswami ... G05B 23/0283 |
| 2020/0159723 A1* | 5/2020 | Goyal .................... G06F 3/0482 |

FOREIGN PATENT DOCUMENTS

| | | |
|---|---|---|
| DE | 102016108197 | 11/2016 |
| JP | 11184519 | 7/1999 |

OTHER PUBLICATIONS

EP Search Report dated Aug. 14, 2019 based on EP 19154574.8.

* cited by examiner

Primary Examiner — Kenneth M Lo
Assistant Examiner — Istiaque Ahmed
(74) Attorney, Agent, or Firm — Cozen O'Connor

(57) ABSTRACT

A method for visualizing process data in which a process control system controls and monitors an industrial technology plant, wherein the process control system automatically triggers a process alarm if the process data fulfills a trigger condition such a corresponding alarm message is transferred to an alarm system for output to an operator, triggered process data alarms are archived as a history, such that by selecting a process data item and specify a display period by the operator the alarm system simultaneously requests the history of the selected process data item process alarms assigned to a process object for the display period, where the alarm system outputs a time sequence of the process data item as a graphic and presents process data points in the graphic in an encoding that specifies for each process data point the highest priority with which process alarms have occurred during the acquisition period.

9 Claims, 6 Drawing Sheets

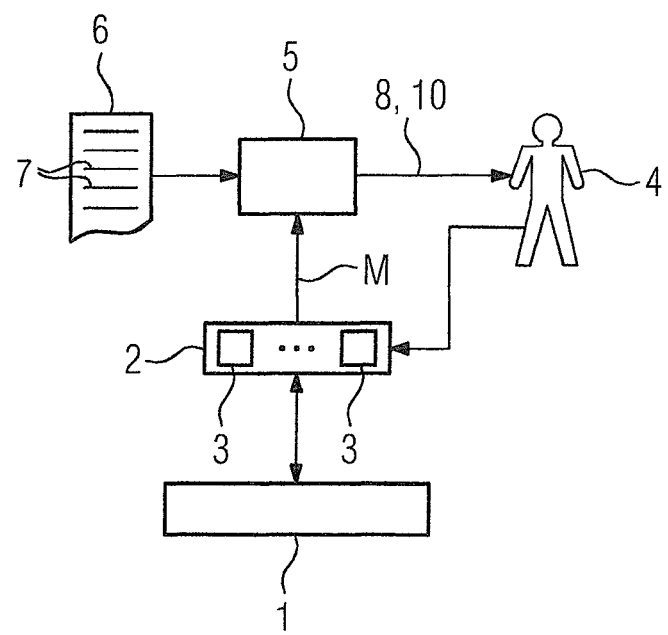

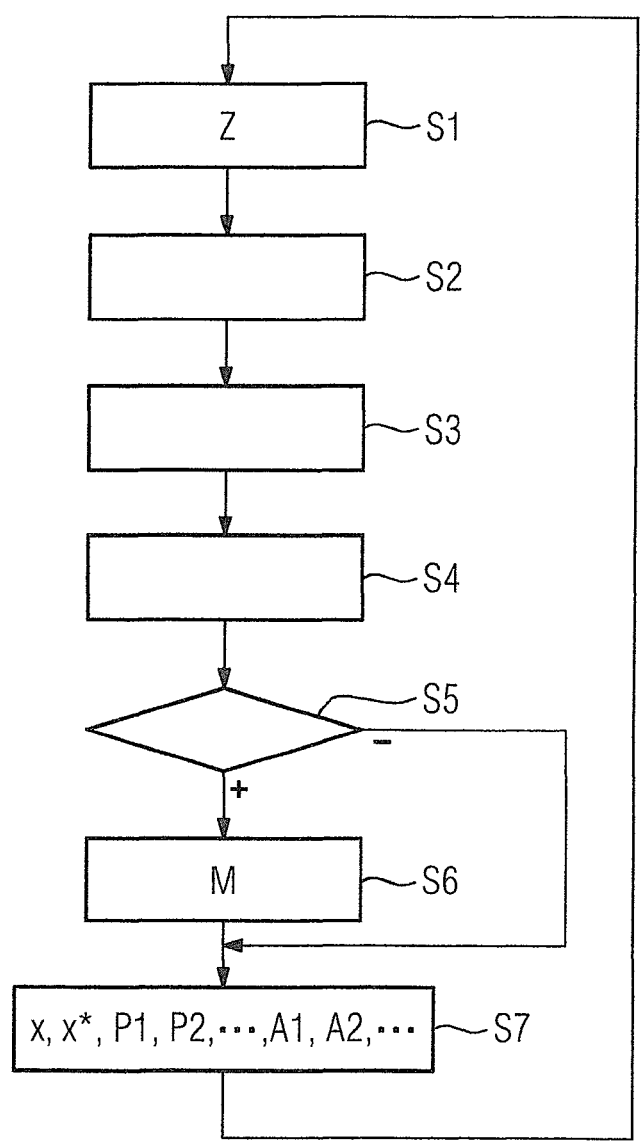

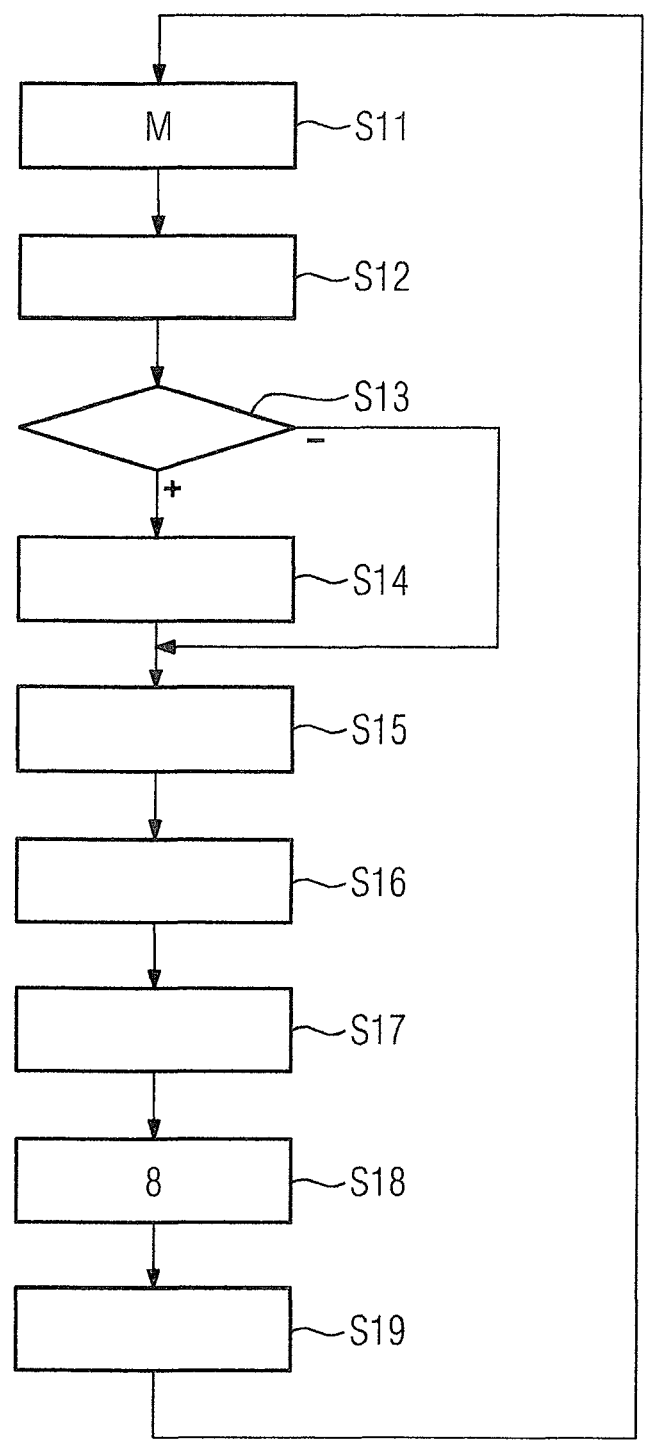

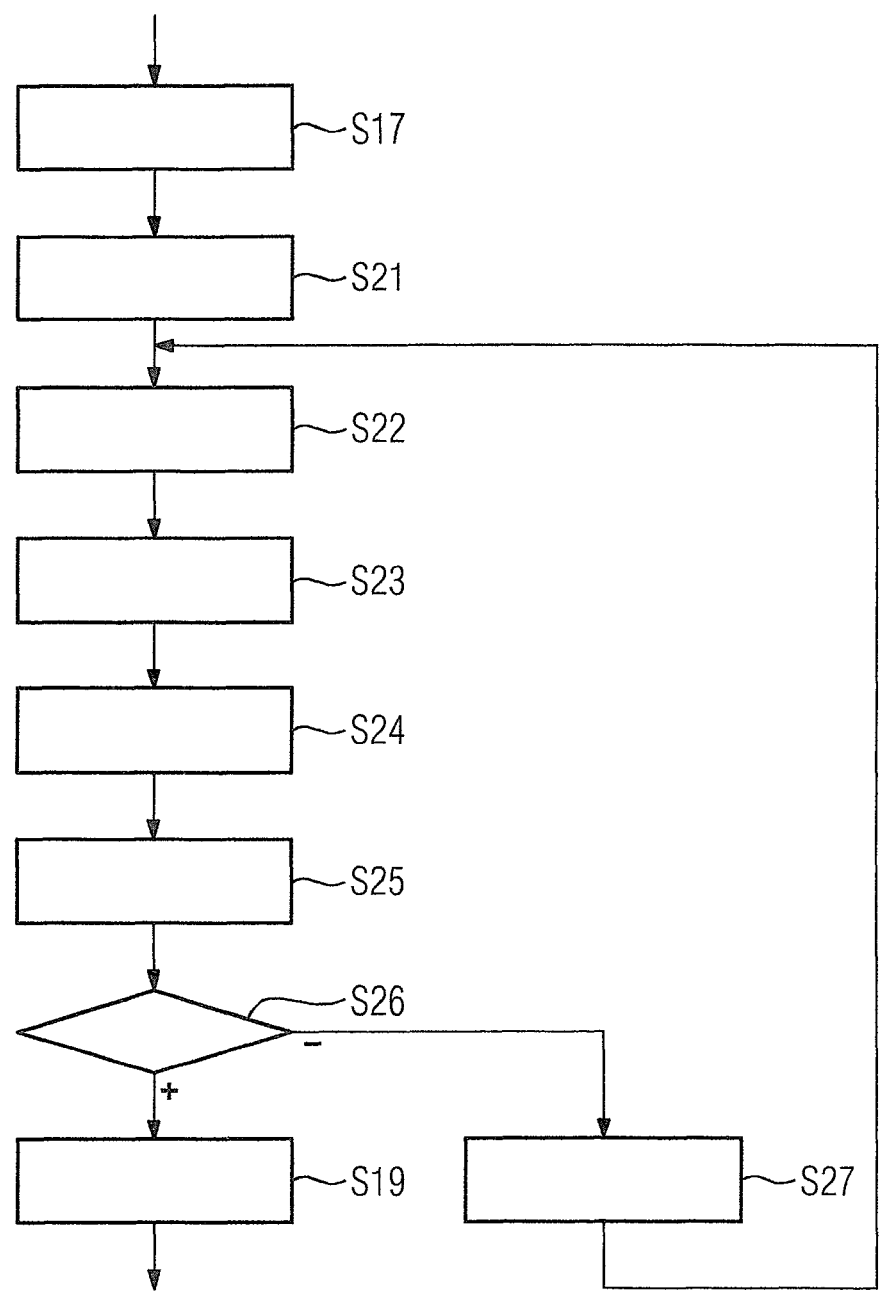

FIG 8
FIG 9
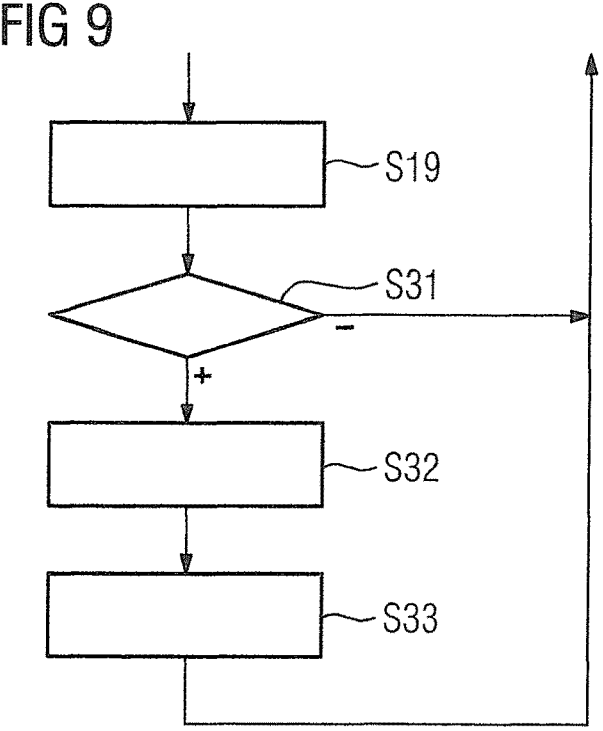
FIG 10
| No. | Time | Alarm | Prio |
|-----|------|-------|------|
| 17  | ---. | ---.  | ---. |
| 18  | ---. | ---.  | ---. |
|     | ---. | ---.  | ---. |
| 19  | ---. | ---.  | ---. |
| 20  | ---. | ---.  | ---. |
10

COMMON VISUALIZATION OF PROCESS DATA AND PROCESS ALARMS

BACKGROUND OF THE INVENTION

1. Field of the Invention

The present invention method for visualizing process data and process alarms assigned to a process object, where an industrial technology plant is controlled and monitored by a process control system, process objects and the assignment of the respective process data and the respective process alarms to the process objects are known to the process control system, the process alarms each have a priority, the process control system automatically triggers a process alarm of the respective process object if the process data assigned to the respective process object fulfills a predetermined trigger condition, where, when a process alarm is triggered, the process control system transfers a corresponding alarm message to an alarm system, where the alarm system outputs the corresponding process alarm to at least one operator, at acquisition times the process control system archives the process data and the process alarms triggered at that moment in the sense of a history, where the alarm system, based on the selection of a process data item and the specification of an associated display period by the at least one operator, requests the history of the selected process data item for the predetermined display period from the process control system and outputs the associated time sequence as a graphic to the at least one operator, the graphic comprises a number of process data points and where the alarm system establishes the process data points on the basis of the values of the selected process data item of a respective acquisition period characteristic of the respective process data point.

The present invention furthermore relates to a non-transitory computer-readable medium encoded with a computer program for an alarm system, where the computer program comprises machine code that can be processed by the alarm system, wherein the alarm system, based on the processing of the machine code accepts alarm messages from a process control system controlling and monitoring an industrial technology plant alarm about process alarms occurring, having a respective priority, and outputs the process alarms occurring to at least one operator, based on the selection of a process data item assigned to a process object of the process control system and the specification of an associated display period by the at least one operator of the process control system, requests from the process control system for the predetermined display period the history of values of the selected process data item acquired by the process control system at acquisition times and archived in the sense of a history and outputs to the at least one operator the associated time sequence as a graphic comprising a number of process data points and establishes the process data points based on the values of the selected process data item of a respective acquisition period characteristic of the respective process data point.

The present invention also relates to an alarm system, where the alarm system is programmed with a computer program, such that, during operation, the alarm system implements the method steps specified above in conjunction with the computer program.

2. Description of the Related Art

What are known as process object views are of great importance for the operation and supervision of process plants. What are known as block symbols for the process objects are integrated into associated plant diagrams which, as well as an important process value, also graphically represent various items of status information, such as process alarms or simulation results. Using the block symbols as starting points, views can also be opened for the process objects, which as well as the pure supervision of a process object, also make its operation possible. Using such views as starting points, further views can be opened, for example, trend curves or an alarm view with the relevant alarms for the respective process object. Trend curves usually show the course of a respective process value as a function of time. Alarms are mostly shown in the form of a notification sequence display, i.e., as a chronological list of the respective process alarms that have occurred.

Approaches to supplementing trend curves with suitable information about process alarms are also known in the prior art. Here, a notification sequence of process alarms is shown separately from the trend curve on a screen or the like, for example, below the trend curve. The notification sequence can be parameterized via a filter such that only process alarms that are assigned to the process object underlying the trend curve are shown.

The interaction between these two displays is greatly restricted. A corresponding projection is always necessary. Furthermore, at the run time of the trend curve and the notification sequence display, an operator must look at both the trend curve and also the notification sequence display and make the link mentally and intellectually between the associated information. Abstraction mechanisms are also absent for an efficient operation and supervision in this approach. The operator is confronted by all underlying process alarms and all details, so that the operator is bombarded with information so to speak, although the operator is often only interested in whether this is a process alarm at all, or with a number of process alarms, which is the most important process alarm that has occurred.

SUMMARY OF THE INVENTION

It is an object of present invention to provide a method that makes it possible for an operator to dynamically retrieve information via which an assignment of process alarms to specific process data is possible for the operator in a simple and intuitive way.

This and other objects and advantages are achieved in accordance with the invention by a visualization method via which the alarm system, together with the history of the selected process data item for the same display period, also requests the history of the process alarms assigned to the respective process object and the alarm system shows the process data points in the graphic in an encoding that specifies the highest priority with which process alarms have occurred during the respective acquisition periods for the respective process data point in each case.

Through this method of operation, the associated process alarms are integrated into the graphic shown as such, i.e., into the trend curve itself. Through this, the operator can see directly in the graphic itself shown whether and if necessary which process alarms have occurred or which priority the process alarms that have occurred have. A parameterization of a filter for the process alarms by the operator is not required. Based on the encoding of the process data points with the highest priority of a process alarm that has occurred, the information about the most important alarm is available to the operator immediately. This enables the operator, in a subsequent step, to directly and immediately select precisely those areas of the graphic shown in which high-priority process alarms have occurred.

Preferably, the encoding additionally includes whether the respective acquisition period only comprises a single acquisition time or a number of acquisition times. Thus, the process data points are encoded differently, depending on whether the respective acquisition period, i.e., the period underlying an individual process data point in each case, comprises just a single acquisition time or a number of acquisition times. This enables the operator to see immediately whether a more precise resolution can lead to improved understanding at this point.

Preferably, the encoding additionally comprises information about the reliability of the respective process data point. This can be of significance for the operator with respect to assessing the relevance of the process data points.

Preferably, the alarm system automatically establishes, based on a selection of at least one process data point by the at least one operator, a notification sequence display, which at least lists for the acquisition period underlying the at least one selected process data point the process alarms with the highest priority occurring and shows them to the at least one operator. Through this an analysis of the graphic shown is possible for the operator in a simple way.

It is also an object of the invention to provide a non-transitory computer-readable medium encoded with a computer program provided with machine code such that the alarm system, as a result of the processing of the machine code together with the history of the selected process data item for the same display period, also requests the history of process alarms archived by the process control system at the acquisition times in the sense of a history, assigned to the respective process object and shows the process data points in the graphic in an encoding that specifies the highest priority with which process alarms have occurred during the respective acquisition periods for the respective process data point in each case.

The advantages obtained by this correspond to those of the visualization method. Furthermore, the advantageous embodiments of the computer program also correspond to the advantageous embodiments of the visualization method. The same applies for the advantages obtained in each respective advantageous embodiment.

It is also an object of the invention to provide an alarm system via which, in accordance with the invention, the alarm system is programmed with an inventive computer program, so that during operation the alarm system additionally also implements the inventive method steps of the computer program.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The characteristics, features and advantages of this invention described above, as well as the manner in which these are achieved, will become clearer and easier to understand in conjunction with the description given below of the exemplary embodiments, which will be explained in greater detail in conjunction with the drawings. In the drawings, in which:

FIG. 1 shows an overview of a plant; in accordance with the invention;

FIG. 2 shows a process object; in accordance with the invention;

FIG. 3 shows a flow diagram; in accordance with the invention;

FIG. 4 shows a flow diagram; in accordance with the invention;

FIG. 5 shows a flow diagram; in accordance with the invention;

FIG. 8 shows various encodings; in accordance with the invention;

FIG. 9 shows a flow diagram in accordance with the invention; and

FIG. 10 shows a notification sequence display in accordance with the invention.

DETAILED DESCRIPTION OF THE EXEMPLARY EMBODIMENTS

Figure 6:
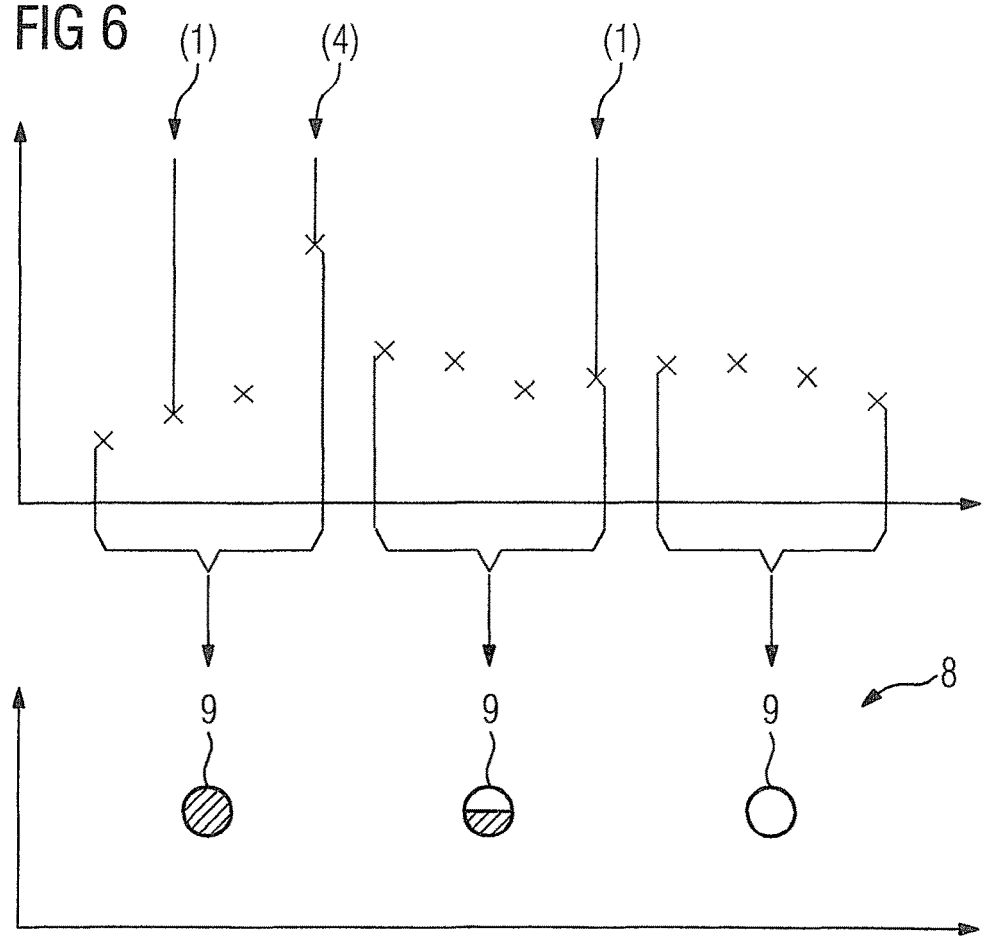
FIG. 6 shows a time sequence of a process data item and process alarms and a graphic; in accordance with the invention.

In accordance with FIG. 1 an industrial technology plant 1 is controlled and monitored by a process control system 2. The industrial technology plant 1 can, for example, be a processing plant. It can also involve another plant, however. The process control system 2 comprises control devices for individual parts of the industrial technology plant 1. The effect of the control devices on the respective part of the industrial technology plant 1 and the interaction of the control devices with one another is guided by higher-ranking computers.

What are known as process objects 3 are known to the process control system 2. The process objects 3 can be defined, for example, within the framework of a project planning of the process control system 2. An example of a process object 3 is a closed-loop controller, which regulates a variable of the industrial technology plant 1. There are also other process objects 3 however.

Assigned to the process objects 3 in each case is process data $x$, $x^*$, $P_i$ ($i=1, 2, \ldots$) as depicted in the diagram in FIG. 2. The process data $x$, $x^*$, $P_i$ can, for example, be actual values $x$, required values $x^*$, parameters $P_i$ of a closed-loop controller and more besides. The parameters $P_i$ can, for example, in the case of a PI controller be the proportional amplification, the reset time and the amount of the maximum output value of the closed-loop controller. Also assigned to the process objects 3, as depicted in the diagram in FIG. 2 are process alarms $A_j$ ($j=1, 2, \ldots$). The process alarms $A_j$ each have a priority. The respective priority is shown in brackets in FIG. 2 after the respective process alarm $A_j$. Purely by way of example, it is assumed below that the process alarm A1 has the lowest priority 1, the process alarm A2 has the highest priority 4 and the process alarm An has a medium priority 2. Both the assignment of the respective process data $x$, $x^*$, $P_i$ and also the assignment of the respective process alarms $A_j$ to the process objects 3 are known to the process control system 2.

As shown in FIG. 3, the process control system 2 implements a control and monitoring method. In accordance with FIG. 3, the process control system 2, in a step S1, accepts a current state Z of the industrial technology plant 1. The current state Z particularly comprises the actual values x of the closed-loop controller. In a step S2, the process control system 2 accepts inputs from an operator 4 (see FIG. 1). The inputs can comprise specifications for the process objects 3, for example, new required values x* for the closed-loop controllers or a change to the parameters Pi of the closed-loop controllers. The term "operator" is used in a generic sense within the framework of the present invention. It can involve a single operator or a number of people.

In a step S3, the process control system 2 determines control variables for the industrial technology plant 1. In establishing the control variables, the process control system 2 particularly evaluates the process data x, x*, Pi assigned to the individual process objects 3. In a step S4, the process control system 2 outputs the control variables established to the industrial technology plant 1 and through this controls the industrial technology plant 1.

In a step S5, the process control system 2 checks whether a trigger condition is fulfilled for a process alarm Aj. The check is performed by the process control system 2 individually for each process object 3 and within the respective process object 3 individually for each process alarm Aj. The process control system 2 decides the question of whether or not the respective trigger condition is fulfilled based on its process data x, x*, Pi assigned to the respective process object 3. The trigger condition can be fulfilled, for example, if an item of process data x, x*, Pi of the corresponding process object 3 (in particular an actual value x) exceeds or falls below a predetermined value or if specific combinations of values are produced or other derived values exceed certain limits.

If the trigger condition is fulfilled, then the process control system 2, in a step S6, automatically triggers the corresponding process alarm Aj and transfers a corresponding alarm message M to an alarm system 5 (see FIG. 1). Otherwise, if the trigger condition is not fulfilled, then the step S6 is thus skipped.

In a step S7, the process control system 2 archives the process data x, x*, Pi and the currently triggered process alarms Aj. The archiving is done in the sense of a history. The respective archived values x, x*, Pi, Aj are thus, on the one hand, assigned the respective acquisition time. Furthermore, the archived values are not overwritten, but the new values to be archived are added to the already archived values, so that both the new values to be archived and also the values already archived are available at later times for evaluations.

The procedure of FIG. 3 is repeated cyclically again-and-again. Thus, from step S7 the process control system 2 goes back to step S1.

The alarm system 5 is programmed with a computer program 6. The computer program 6 comprises machine code 7, which can be processed by the alarm system 5. As a result of processing the machine code 7, the alarm system 5 (inter alia) performs a visualization method, which is explained in greater detail below in conjunction with FIG. 4.

In a step S11, the alarm system 5 accepts the transferred alarm messages M from the process control system 2. In a step S12, the alarm system 5 outputs the corresponding process alarms Aj (more precisely: the corresponding messages) to the operator 4. The output of the respective process alarm Aj to the operator 4 can, for example, be done by a visual indication. If necessary, the visual indication can be supported by an acoustic notification.

In a step S13, the alarm system 5 checks whether it has received an acknowledgement from the operator 4 for the respective process alarm Aj. For as long as this is not the case, the alarm system 5 skips a step S14. If, on the other hand, the alarm system 5 has received an acknowledgement from the operator 4 for the corresponding process alarm Aj, then the alarm system 5 terminates the output of the respective process alarms Aj to the operator 4, in step S14.

In a step S15, the alarm system 5 accepts from the operator 4 a selection of a process data item x, x*, Pi. In step S15, the operator 4 can, in principle, select any given item of process data x, x*, Pi. Often, however, this will involve an actual value x. Furthermore, in a step S16 the alarm system 5 accepts from the operator 4 a display period. The display period is defined by the operator 4. Consequently, it is not known in advance, as far as the alarm system 5 is concerned, which value the display period possesses. Thus, from the standpoint of the alarm system 5 the display period can in principle be any given length.

In a step S17, the alarm system 5 requests from the process control system 2 the history of the selected process data item x, x*, Pi for the predetermined display period. Furthermore, in step S17, the alarm system 5 at the same time also requests from the process control system 2 for the same display period the history of the process alarms Aj assigned to the respective process object 3.

In a step S18, the alarm system 5 establishes a graphic 8 (see FIGS. 1 and 6). The graphic 8 represents the time sequence of the selected process data item x, x*, Pi for the predetermined display period. The alarm system 5 outputs the graphic 8 to the operator 4 in a step S19. The step S18 will be explained in detail in conjunction with FIG. 5.

In accordance with FIG. 5, to establish the graphic 8, the alarm system 5 initially selects, in a step S21, a first process data point 9 (see FIG. 6). In a step S22, the alarm system 5 establishes an associated acquisition period for the selected process data point 9.

In a step S23, the alarm system 5 then establishes, on the basis of the values of the selected process data item x, x*, Pi archived in this acquisition period, the associated value of the selected process data point 9. For example, the alarm system 5 can include as the corresponding value the average of the values of the selected process data item x, x*, Pi. As an alternative, the value of the respective process data point 9 can be determined, for example, by a median value, the minimum, the maximum or another statistical value of the selected process data item x, x*, Pi.

In a step S24, the alarm system 5 establishes an encoding for the value determined in step S23. The encoding is characteristic of what the highest priority is, with which process alarms Aj have occurred during the respective acquisition period. In a step S25, the alarm system 5 assigns the encoding established in step S24 to the selected process data point 9.

In a step S26, the alarm system 5 checks whether it has already performed steps S22 to S25 for all process data points 9. If this is not the case, then the alarm system 5 moves to a step S27, in which the alarm system 5 selects the next process data point 9. The alarm system 5 then reverts back to step S22. Otherwise, the procedure of FIG. 5 is ended.

Thus, in accordance with the diagram in FIG. 6, the graphic 8 comprises a number of process data points 9. FIG. 6 shows in its upper area, indicated in each case by small crosses, the value of the selected process data item x, x*, Pi at the respective acquisition time. The highest priority of the process alarms Aj triggered at the respective acquisition time is also plotted above the respective small cross. Both the individual values of the selected process data item x, x*, Pi and also each process alarm Aj triggered can vary from acquisition time to acquisition time.

In accordance with the diagram in FIG. 6, with the corresponding specification of the acquisition period by the operator 4, it can occur that a few or all of the acquisition periods each comprise a number of acquisition times. According to the (purely exemplary) diagram depicted in FIG. 6 process alarms Aj with the priority 1 and with the priority 4 have occurred, for example, in the acquisition period for the front process data point 9. Furthermore, process alarms Aj with the priority 1 have occurred in the acquisition period for the middle process data point 9. No process alarms Aj have occurred in the acquisition period for the rear process data point 9.

In this case, the front process data point 9 is encoded in accordance with priority 4, for example, as shown in FIG. 6, by a completely filled-in element, here by a circle. The middle process data point 9 is encoded in accordance with the priority 1, for example, as shown in FIG. 6, by a partly filled-in element. The rear process data point 9 is encoded in accordance with the priority 0 (=no process alarms Aj occurred), for example, as shown in FIG. 6, by a non-filled-in element.

The encodings shown in FIG. 6 are purely exemplary. Other encodings can also be selected. For example, it is possible for the encoding of the priority of the process alarm Aj to select a color encoding or a shape encoding. In the case of a color encoding, red can be assigned to the highest priority, for example, yellow to a medium priority and green to the priority 0 (i.e., the case in which no process alarm Aj has occurred). Other or further graduations are also possible, such as orange or half yellow and half red or blue.

Because of the fact that the display period is predetermined by the operator 4, it can furthermore also occur that a few or all of the acquisition periods each only comprise a single acquisition time. In this case, the procedure is the same. However, in the case that the respective acquisition period only comprises a single acquisition time, the process data x, x*, Pi and process alarms Aj acquired at the associated acquisition time are directly and immediately the basis for the respective process data point 9. It is possible, however, to distinguish in the encoding whether a respective acquisition period only comprises a single acquisition time or whether it comprises a number of acquisition times. This will be explained in greater detail below in conjunction with FIG. 7.

Figure 7:
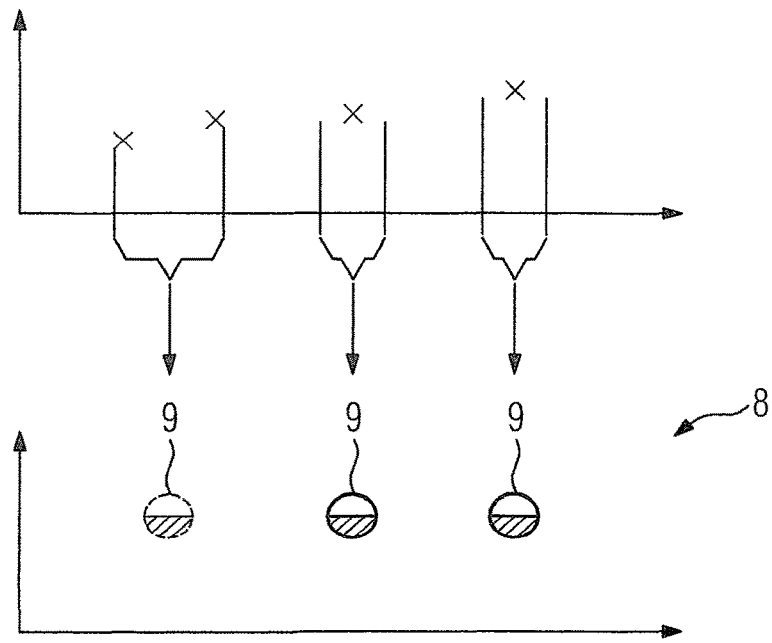
FIG. 7 shows a time sequence of a process data item and process alarms and a graphic in accordance with the invention.

In accordance with the diagram in FIG. 7, the display period predetermined by the operator 4 (purely by way of example) comprises four acquisition times, while the number of process data points 9 amounts to three. The acquisition period of one of the process data points 9 thus comprises two acquisition times, while the acquisition periods of the two other process data points 9 each comprise only one single acquisition time. For the sake of simplicity, it is further assumed that during all acquisition times the same alarm state exists uniformly, for example, there is a process alarm Aj of priority 1. What is stated below is however also applicable if the priorities of the existing process alarms Aj of the acquisition times are not uniform.

In accordance with the diagram in FIG. 7 those process data points 9 of which the respective acquisition period only comprises a single acquisition time are shown with a solid outline, while those process data points 9 of which the acquisition period comprises a number of acquisition times are shown with a dashed outline. As a result of the different encoding of the process data points 9, it is thus possible to see directly whether the respective process data point 9 can be resolved even further or not.

It should be understood the encoding explained above in conjunction with FIG. 7 can also be undertaken in another way. For example, a color encoding can be graduated accordingly. It is also possible, for example, to supplement a color encoding for the corresponding priority of the process alarms Aj by an additional specification of a symbol A or B (depending on whether the acquisition period of the respective process data point 9 only comprises a single acquisition time or a number of acquisition times).

The advantage of this type of presentation lies especially in the fact that, in the event of the acquisition period of a respective process data point 9 comprising a number of acquisition times, it is often no longer evident on the basis of the data value of the respective process data point 9 whether and possibly why a specific process alarm Aj has been triggered. By the manner of encoding just explained, however, information is communicated to the operator 4 regarding the points at which he must request a refined presentation of process data x, x*, Pi in order to obtain full information.

Furthermore, it is possible for the encoding of the process data points 9 to additionally contain a specification about the reliability of the respective process data point 9. FIG. 8 shows an encoding that varies as a function of the reliability of the respective process data point 9. For example, according to the diagram depicted in FIG. 8, the reliability of the respective process data point 9 can be divided into a number of stages. The division selected in FIG. 8 into three stages is purely exemplary. The encoding of the respective process data point 9 is chosen as a function of the reliability of the respective process data point 9. For example, according to the diagram depicted in FIG. 8 the contour of the respective process data point 9 can be varied. According to the diagram depicted in FIG. 8, for example, a rectangle standing on one edge stands for a high reliability, a triangle standing on one edge for a medium reliability and a rectangle standing on a corner for a low reliability of the respective process data point 9. It should be understood other types of encoding are also possible. The encoding for the lowest reliability that has occurred during the associated acquisition period is shown for the respective process data point 9.

To establish the degree of reliability, the process control system 2 can, for example, detect a broken wire or a short circuit of connecting lines for sensors or the like. When and for as long as the sensor is functioning correctly, especially no wire break and/or no short circuit of the connecting lines is detected, an associated data point 9 has a high reliability. Shortly after a wire break or a short circuit has occurred, a process data point 9 has a medium reliability. After a longer time, a process data point 9 only has a low reliability. When the connecting lines are repaired again the reliability of the process data point 9 is high again.

It has also been assumed within the framework of FIG. 8 that the same alarm state exists uniformly, for example, a process alarm Aj of priority 1 exists. What is stated here is also applicable, however, when the priorities of the existing process alarms Aj of the acquisition times are not uniform.

The present invention can furthermore also be embodied in another way. For example, it is possible for the alarm system 5 according to the diagram depicted in FIG. 9, after the presentation of the graphic 8 in step S19, to check in a step S31 whether the operator 4 has selected at least one (as a rule exactly one) process data point 9. The selection can be made, for example, by "clicking on" the corresponding process data point 9 with a computer mouse or other input device or methodology.

If the operator 4 has selected at least one process data point 9, the alarm system 5 goes to a step S32. In step S32, the alarm system 5 first establishes for the selected process data points 9 the start and the end of the corresponding acquisition period and the associated acquisition times. In a step S33, the alarm system then automatically establishes for the acquisition period or for the associated acquisition times a notification sequence display 10 (see FIG. 10) and shows the notification sequence display 10 to the operator 4. The notification sequence display 10 accordingly lists the presentation in FIG. 10 (preferably as a chronological sequence and with specification of the respective acquisition times) at least for the acquisition period determined in step S32 the process alarms Aj that have occurred with the highest priority in each case. If necessary the further process alarms Aj with lower priority that have occurred can also be included. In addition, the acquisition period as such and/or an identification and/or a plain text name of the process object 3 and/or of the process data item x, x*, Pi can be displayed as well.

Various advantageous embodiments of the present invention have been explained above. At its heart however the present invention relates to the following subject matter:

A process control system 2 controls and monitors an industrial technology plant 1. Process objects 3 and the assignment of process data x, x*, Pi and process alarms Aj to the process objects 3 are known to the process control system 2. The process alarms Aj each have a priority. The process control system 2 automatically triggers a process alarm Aj if the process data x, x*, Pi fulfills a trigger condition. In this case, the process control system 2 transfers a corresponding alarm message M to an alarm system 5, which outputs the corresponding process alarm Aj to an operator 4. At acquisition times, the process control system 2 archives the process data x, x*, Pi and the triggered process alarms Aj in the sense of a history. The alarm system 5, based on the selection of a process data item x, x*, Pi and the specification of a display period by the operator 4, requests from the process control system 2 for the display period the history of the selected process data item x, x*, Pi and at the same time also the history of the process alarms Aj assigned to the respective process object 3. The alarm system 5 outputs the associated time sequence of the process data item x, x*, Pi as a graphic 8 to the operator 4. The graphic 8 comprises a number of process data points 9, which the alarm system 5 establishes based on the values of the selected process data item x, x*, Pi of a respective acquisition period. The alarm system 5 represents the process data points 9 in the graphic 8 in an encoding, which specifies the highest priority for the respective process data point 9 in each case with which process alarms Aj have occurred during the respective acquisition period.

The present invention has many advantages. In particular, it results in a simple, intuitive handling by the operator 4. A simultaneous handling of different presentations, in particular of a trend curve on the one hand and an alarm list on the other hand, is not necessary. Furthermore, it is possible to retrieve the notification sequence display 10 directly from the graphic 8.

Although the invention has been illustrated and described in greater detail by the preferred exemplary embodiment, the invention is not restricted by the disclosed examples and other variations can be derived herefrom by the person skilled in the art, without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for visualizing process data and process alarms assigned to a process object, an industrial technology plant being controlled and monitored by a process control system, process objects and an assignment of respective process data and respective process alarms to the process objects being known to the process control system, the process alarms each having a priority, the method comprising:

triggering automatically, by the process control system, a process alarm of a respective process object if a respective process data assigned to the respective process object fulfills a predetermined trigger condition;

transferring, by the process control system, a corresponding alarm message to an alarm system when a process alarm is triggered;

outputting, by the alarm system, a corresponding process alarm to at least one operator;

archiving, by the process control system, the process data and the currently triggered process alarms at acquisition times in each case as a history;

requesting, by the alarm system, as a result of a selection of a process data item and a specification of an associated display period by the at least one operator, the history of the selected process data item a predetermined display period from the process control system and outputting an associated time sequence as a graphic to the at least one operator, the graphic comprising a number of process data points;

establishing, by the alarm system, the process data points based on values of the selected process data item of a respective acquisition period characteristic of the process data point;

requesting, by the alarm system, together with the history of the selected process data item, a history of the process alarms assigned to a respective process object for the same display period; and presenting, by the alarm system, the process data points in the graphic in an encoding, which each specify a highest priority for a respective process data point with which process alarms have occurred during a respective acquisition period;

wherein said encoding additionally comprises an indication as to whether the respective acquisition period comprises only one single acquisition time or a number of acquisition times.

2. The visualization method as claimed in claim 1, wherein said encoding additionally comprises a specification with respect to a reliability of the respective process data points.

3. The method as claimed in claim 2, wherein the alarm system, based on a selection of at least one process data point by the at least one operator, automatically establishes a notification sequence display, which lists, at least for an acquisition period underlying the at least one selected process data point, process alarms having highest priorities that have occurred, and displays said process alarms with the highest priorities to the at least one operator.

4. The method as claimed in claim 1, wherein the alarm system, based on a selection of at least one process data point by the at least one operator, automatically establishes a notification sequence display, which lists, at least for an acquisition period underlying the at least one selected process data point, process alarms having highest priorities that have occurred, and displays said process alarms with the highest priorities to the at least one operator.

5. A non-transitory computer-readable medium encoded with a computer program for an alarm system, the computer program comprising machine code which, when processed by the alarm system, causes the alarm system to:
- accept, from a process control system controlling and monitoring an industrial technology plant, alarm messages about process alarms having a respective priority that have occurred and output the process alarms that have occurred to at least one operator;
- request from the process control system for a predetermined display period, based on a selection of a process data item assigned to a process object of the process control system and a specification of an associated display period by the at least one operator, a history of values of the selected process data item acquired by the process control system at acquisition times and archived as a history and output an associated time sequence as a graphic comprising a number of process data points to the at least one operator;
- establish the process data points based on values of the selected process data item of an acquisition period characteristic of a respective process data point;
- requests, together with the history of the selected process data item for the same display period, a history of process alarms assigned to a respective process object archived by the process control system at the acquisition times in a context of a history; and
- presents the process data points in the graphic in an encoding which specifies a highest priority for each respective process data point with which process alarms have occurred during a respective acquisition period;
- wherein the encoding, as a result of the processing of the machine code, additionally comprises an indication as to whether the respective acquisition period comprises only one single acquisition time or a number of acquisition times.

6. The computer program as claimed in claim 5, wherein the encoding, as a result of the processing of the machine code, additionally comprises a specification about a reliability of the respective process data point.

7. The computer program as claimed in claim 6, wherein the alarm system automatically establishes a notification sequence display, as a result of a selection at least one process data point by the at least one operator, which lists, at least for the acquisition period underlying the at least one selected process data point, the process alarms with the highest priority that have occurred and shows said the process alarms with the highest priority to the at least one operator.

8. The computer program as claimed in claim 5, wherein the alarm system automatically establishes a notification sequence display, as a result of a selection of at least one process data point by the at least one operator, which lists, at least for the acquisition period underlying the at least one selected process data point, the process alarms with the highest priority that have occurred and shows said the process alarms with the highest priority to the at least one operator.

9. An alarm system, wherein the alarm system is programmed
- with a computer program comprising machine code, which executed during operation of the alarm system causes said alarm system to:
- accept, from a process control system controlling and monitoring an industrial technology plant, alarm messages about process alarms having a respective priority that have occurred and output the process alarms that have occurred to at least one operator;
- request from the process control system for a predetermined display period, based on a selection of a process data item assigned to a process object of the process control system and a specification of an associated display period by the at least one operator, a history of values of the selected process data item acquired by the process control system at acquisition times and archived as a history and output an associated time sequence as a graphic comprising a number of process data points to the at least one operator;
- establish the process data points based on values of the selected process data item of an acquisition period characteristic of a respective process data point;
- requests, together with the history of the selected process data item for the same display period, a history of process alarms assigned to a respective process object archived by the process control system at the acquisition times in a context of a history; and
- presents the process data points in the graphic in an encoding which specifies a highest priority for each respective process data point with which process alarms have occurred during a respective acquisition period;
- wherein the encoding, as a result of the processing of the machine code, additionally comprises an indication as to whether the respective acquisition period comprises only one single acquisition time or a number of acquisition times.

* * * * *